(12) United States Patent
Ying et al.

(10) Patent No.: US 12,209,645 B2
(45) Date of Patent: Jan. 28, 2025

(54) HYDRAULIC DRIVE AXLE WITH TWO-WAY CLUTCH CONTROL

(71) Applicant: ZHEJIANG KC MECHANICAL & ELECTRICAL CO., LTD., Youngkang (CN)

(72) Inventors: Haoyu Ying, Yongkang (CN); Xiaowei Sun, Yongkang (CN); Yisheng Lu, Yongkang (CN)

(73) Assignee: ZHEJIANG KC MECHANICAL &ELECTRICAL CO., LTD., Zhejiang (CN)

( * ) Notice: Subject to any disclaimer, the term of this patent is extended or adjusted under 35 U.S.C. 154(b) by 0 days.

(21) Appl. No.: 18/015,825

(22) PCT Filed: Dec. 12, 2022

(86) PCT No.: PCT/CN2022/138344
§ 371 (c)(1),
(2) Date: Jan. 12, 2023

(87) PCT Pub. No.: WO2024/011839
PCT Pub. Date: Jan. 18, 2024

(65) Prior Publication Data
US 2024/0247709 A1    Jul. 25, 2024

(30) Foreign Application Priority Data

Jul. 14, 2022   (CN) .......................... 202210834321.6
Jul. 14, 2022   (CN) .......................... 202221825926.0

(51) Int. Cl.
*B60K 17/02*   (2006.01)
*B60K 17/10*   (2006.01)
*F16H 47/02*   (2006.01)
*B60K 17/06*   (2006.01)
*B62D 11/08*   (2006.01)

(52) U.S. Cl.
CPC ............. *F16H 47/02* (2013.01); *B60K 17/02* (2013.01); *B60K 17/105* (2013.01); *B60K 17/06* (2013.01); *B62D 11/08* (2013.01)

(58) Field of Classification Search
CPC ...... B60K 17/02; B60K 17/06; B60K 17/105; F16H 47/02; B62D 11/08
See application file for complete search history.

(56) References Cited

U.S. PATENT DOCUMENTS 5,339,631 A * 8/1994 Ohashi ................. B60K 17/105
91/499

FOREIGN PATENT DOCUMENTS

CN       102860179 A   *  1/2013  ............. A01D 41/02
CN       205105640 U   *  3/2016

* cited by examiner

*Primary Examiner* — William C Joyce
(74) *Attorney, Agent, or Firm* — McDonnell Boehnen Hulbert & Berghoff LLP

(57) ABSTRACT

The present invention provides a hydraulic drive axle with two-way clutch control, comprising a housing, wherein a power assembly and a driving assembly are provided in the housing; the power assembly comprises a plunger pump and a plunger motor; the driving assembly comprises a driving wheel and connected to the plunger motor, and a clutch; one end of the plunger pump is connected to an external driving device for rotation of the plunger pump; power transmission is realized between the plunger motor and the plunger pump through oil circuit conduction; the clutch is arranged on both sides of the driving wheel set and connected to a runner; power is transmitted to the driving wheel set through the plunger pump and the plunger motor; and the clutch on both sides is separately matched with the driving wheel set to realize independent control of the runner on both sides.

8 Claims, 3 Drawing Sheets

HYDRAULIC DRIVE AXLE WITH TWO-WAY CLUTCH CONTROL

TECHNICAL FIELD

The present invention relates to the technical field of mechanical equipment transmission mechanisms, and in particular to a hydraulic drive axle with two-way clutch control.

CROSS REFERENCE TO RELATED APPLICATIONS

This application is a U.S. National Phase of International Application No. PCT/CN2022/138344, filed on Dec. 12, 2022, which claims priority to Chinese Patent Application No. 202210834321.6, filed on Jul. 14, 2022 and Chinese Patent Application No. 202221825926.0, filed on Jul. 14, 2022 all of which are incorporated by reference herein in their entirety.

BACKGROUND ART

Construction machinery equipment, garden machinery equipment and transportation machinery equipment all comprise drive systems, transmission systems and power systems. With the continuous development of processing technology and numerical control technology in the field of machining, more and more mechanical equipment is developing towards the fields of high precision, higher efficiency, high speed and high intelligence. At the same time, higher requirements for the most important transmission systems are also put forward. Most transmissions in the existing market are multi-stage gears. Different rotational speeds are achieved through different combinations of planetary gears, or the speed is changed by means of friction plates. This structure is relatively simple and convenient, but it will also lead to the problems of short service life and under-steering of friction wheel transmission or multi-stage planetary gears, which cannot meet the needs of different usage scenarios of users.

SUMMARY OF THE INVENTION

(1) Technical Problem to be Solved

The technical problem to be solved by the present invention is to provide a hydraulic drive axle with two-way clutch control, which can realize stepless speed change, in-situ steering, more stable power output, independent control of runners on both sides and simple internal structure.

(2) Technical Solutions

In order to solve the above technical problem, a hydraulic drive axle with two-way clutch control is disclosed in the present invention. The hydraulic drive axle comprises a housing, wherein a power assembly and a driving assembly connected to the power assembly are provided in the housing; the power assembly comprises a plunger pump and a plunger motor; the driving assembly comprises a driving wheel set arranged on one side of the plunger motor and connected to the plunger motor, and a clutch matched with the driving wheel set; one end of the plunger pump is connected to an external driving device for rotation of the plunger pump; the plunger motor is arranged above the plunger pump, and power transmission is realized between the plunger motor and the plunger pump through oil circuit conduction; the clutch is arranged on both sides of the driving wheel set and connected to a runner; power is transmitted to the driving wheel set through the plunger pump and the plunger motor; and the clutch on both sides is separately meshed with the driving wheel set to realize independent control of the runner on both sides. The plunger pump is rotated by the power input of the external driving device to generate oil pressure, and oil is pressed from the plunger pump to the plunger motor to realize the rotation of the plunger motor so as to complete the power output of the power assembly, which abandons the traditional gear transmission, and can realize stepless speed change, simple internal structure and more stable power output. In addition, independent clutch control of the runners on both sides can be realized by using the clutch meshed with the driving wheel set, so that the overall structure is simpler.

Further, the clutch comprises a first clutch and a second clutch, the first clutch and the second clutch are arranged on both sides of the driving wheel set, respectively, and the first clutch is meshed with a first runner on one side for transmission, and the second clutch is meshed with a second runner on the other side for transmission. The first clutch is meshed with the first runner for transmission, and the second clutch is meshed with the second runner for transmission, which can realize independent clutch control of the runners on both sides. Therefore, the operating requirements of the hydraulic axle in different situations are realized, and in-situ steering and other operations can be realized. The internal structure is simple, and it is easy for users to operate and use.

Further, the driving wheel set comprises a driving gear and a bevel gear, the driving gear is connected to and matched with the plunger motor, the bevel gear is meshed with the driving gear and matched with the clutch, a rotary rod is rotatably arranged in the housing, and the bevel gear, the first clutch and the second clutch are all coaxially rotatably arranged on the rotary rod. By means of the arrangement of the driving gear and the bevel gear, the power of the plunger motor can be transmitted to the clutch and the runners, and the arrangement of the rotary rod can ensure that the internal structural arrangement is more reasonable.

Further, a first gear tooth and a second gear tooth are formed on both sides of the driving gear, respectively, a first controller and a second controller are provided on the first clutch and the second clutch, respectively, the first controller is used to control disengagement and engagement between the first clutch and the first gear tooth, and the second controller is used to control disengagement and engagement between the second clutch and the second gear tooth. The first controller and the second controller independently control the first clutch and the second clutch, respectively, which is convenient for user operation and use. The arrangement of the first gear tooth and the second gear tooth ensures the meshing between the driving gear and the clutch, and the overall structural arrangement is more reasonable.

Further, one side of the plunger pump is provided with a swash plate, the plunger pump comprises a first cylinder and a first plunger, the first cylinder is rotatably arranged in the swash plate, the first plunger is synchronously rotatably connected to an input shaft of the external driving device, and the first plunger is annularly arranged in the first cylinder and arranged in the same direction as the input shaft. A first thrust bearing is provided between the plunger pump and the swash plate, one end of the first plunger is arranged in the first cylinder, and the other end of the first plunger is matched with the first thrust bearing. The first cylinder can rotate synchronously with the input shaft, and it is combined with the first thrust bearing to make the first plunger reciprocate in the first cylinder, realizing the control of oil pressure to ensure that the plunger motor can be driven to operate. When the swash plate is adjusted, the inclination angle of the first thrust bearing can be changed so as to realize different internal oil pressure control.

Further, the plunger motor comprises a second cylinder and a second plunger, the second cylinder is synchronously rotatably connected to an output shaft of the driving wheel set, and the second plunger is annularly arranged in the first cylinder and arranged coaxially with the output shaft. An oblique stop groove is provided on the housing, a second thrust bearing is provided between the second cylinder and the oblique stop groove, one end of the second plunger is matched with the second thrust bearing, and elastic bodies are provided between the first cylinder and the first plunger, and between the second cylinder and the second plunger. The oblique stop groove is arranged obliquely on the housing at a certain angle, and the oil pressure of the plunger pump can drive the second plunger to be matched with the second thrust bearing and reciprocate in the second cylinder, so as to drive the second cylinder to rotate. Therefore, the power output is realized, the overall structure is simple, the power output is stable, and the stepless speed change can be realized.

Further, the plunger pump and the plunger motor are sealed with an oil separator at one side, and the outer side of the end of the oil separator close to the plunger pump is provided with an oil inlet passage, and both ends of the oil inlet passage are provided with one-way control valves for controlling the flow of external oil into the plunger pump. Therefore, the one-way circulation inside the plunger pump can be achieved, which can achieve a certain effect of replenishing oil, and the internal structural arrangement is more reasonable.

Further, one end of the rotary rod and the first clutch are meshed and provided with a linkage gear, and an elastic member for resetting the first clutch is arranged between the first clutch and the linkage gear. The meshing engagement between the clutch and the bevel gear can therefore be ensured, and the internal structural arrangement is more reasonable.

(3) Beneficial Effects

Compared with the prior art, the hydraulic drive axle with two-way clutch control of the present invention has the following advantages: it can ensure a more stable power output, and can realize the independent control of the runners on both sides. By means of the provided plunger pump and plunger motor, the oil pressure is used to drive the transmission, which abandons the traditional gear meshing transmission, and can realize stepless speed change. Moreover, by means of the engagement of the clutch and the driving wheel set, the output on both sides is controlled independently, so as to meet the needs of different scenarios such as turning while ensuring that the efficiency of power output is higher, the overall structure is simpler and the service life is longer.

Figure 1:
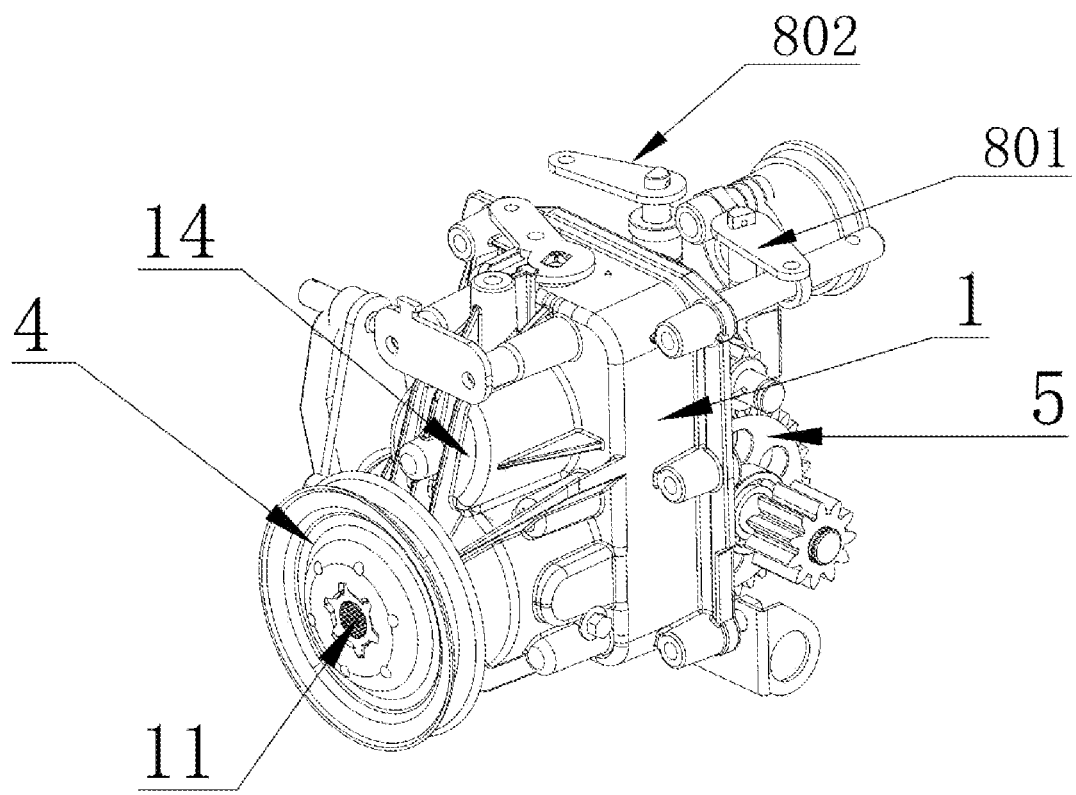
FIG. 1 is a three-dimensional view of a hydraulic drive axle with two-way clutch control of the present invention.

In the figures: 1 is a housing; 2 is a power assembly; 201 is a plunger pump; 202 is a plunger motor; 3 is a driving assembly; 301 is a clutch; 311 is a first clutch; 321 is a second clutch; 302 is a driving wheel set; 312 is a driving gear; 322 is a bevel gear; 4 is an external driving device; 5 is a runner; 501 is a first runner; 502 is a second runner; 6 is a rotary rod; 701 is a first gear tooth; 702 is a second gear tooth; 801 is a first controller; 802 is a second controller; 901 is a first cylinder; 902 is a second cylinder; 1001 is a first plunger; 1002 is a second plunger; 11 is an input shaft; 1201 is a first thrust bearing; 1202 is a second thrust bearing; 14 is a swash plate; 15 is an oil inlet passage; 16 is an oil separator; 18 is a linkage gear; 19 is an elastic member, and 20 is a one-way control valve.

DETAILED DESCRIPTION OF PREFERRED EMBODIMENTS

Specific implementations of the present invention will be described in further detail below with reference to the accompanying drawings and embodiments. The following embodiments are intended to illustrate the present invention, but not to limit the scope of the present invention.

Referring to FIGS. 1 to 6, a hydraulic drive axle with two-way clutch control comprises a housing 1, wherein a power assembly 2 and a driving assembly 3 connected to the power assembly 2 are arranged in the housing 1. The power assembly 2 comprises a plunger pump 201 and a plunger motor 202. The driving assembly 3 comprises a driving wheel set 302 arranged on one side of the plunger motor 202 and connected to the plunger motor 202, and a clutch 301 meshed with the driving wheel set 302. One end of the plunger pump 201 is connected to an external driving device 4 for rotation of the plunger pump 201. The plunger motor 202 is arranged above the plunger pump 201, and power transmission is realized between the plunger motor 202 and the plunger pump 201 through oil circuit conduction. The clutch 301 is arranged on both sides of the driving wheel set 302 and connected to a runner 5. Power is transmitted to the driving wheel set 302 through the plunger pump 201 and the plunger motor 202, and the clutch 301 on both sides is separately meshed with the driving wheel set 302 to realize independent control of the runner 5 on both sides. In this embodiment, the external driving device 4 is a belt pulley, and the clutch 301 is arranged on both sides of the driving wheel set 3 and connected to the runner. The power is transmitted to the driving wheel set 3 through the plunger pump 201 and the plunger motor 202, and the clutch 301 on both sides is separately meshed with the driving wheel set 3 to realize the independent control of the runner 5 on both sides. The plunger pump 201 is rotated by means of the power input of the external driving device 4 to generate oil pressure, and oil is pressed from the plunger pump 201 to the plunger motor 202 to realize the rotation of the plunger motor 202 so as to complete the power output of the power assembly 2, which abandons the traditional gear transmission, and can realize stepless speed change, simple internal structure and more stable power output. In addition, independent clutch control of the runner 5 on both sides can be realized by using the clutch 301 meshed with the driving wheel set 3, so that the overall structure is simpler.

Figure 2:
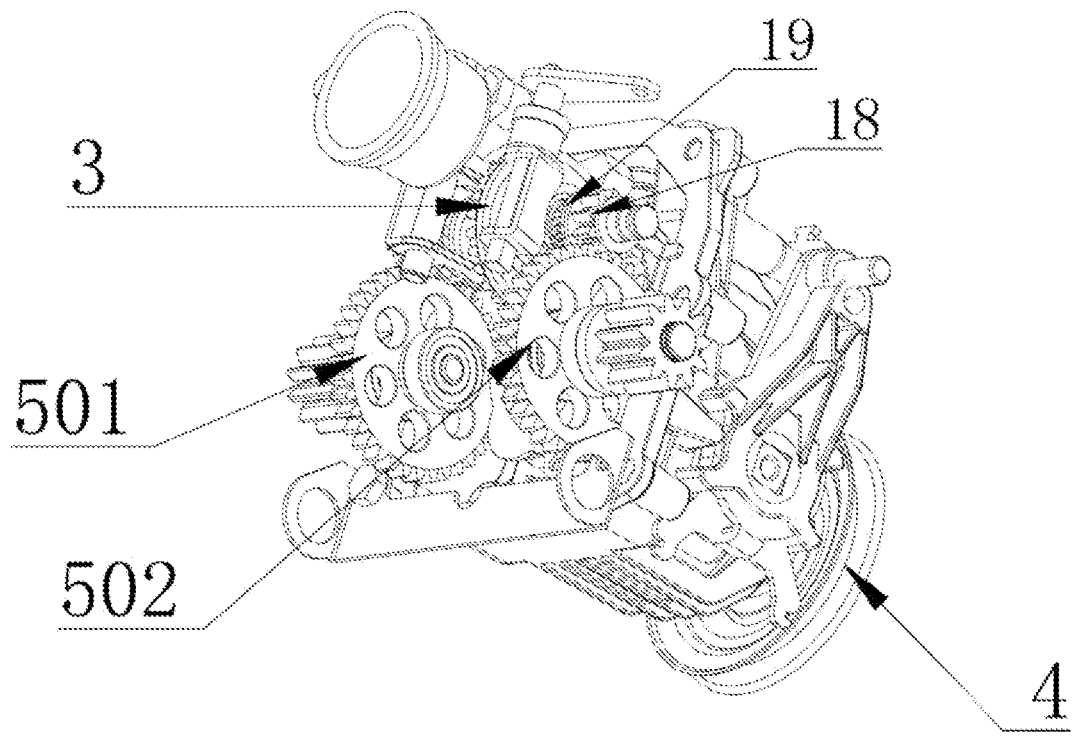
FIG. 2 is a three-dimensional view of a hydraulic drive axle with two-way clutch control of the present invention in which the bottom is upward.
Figure 4:
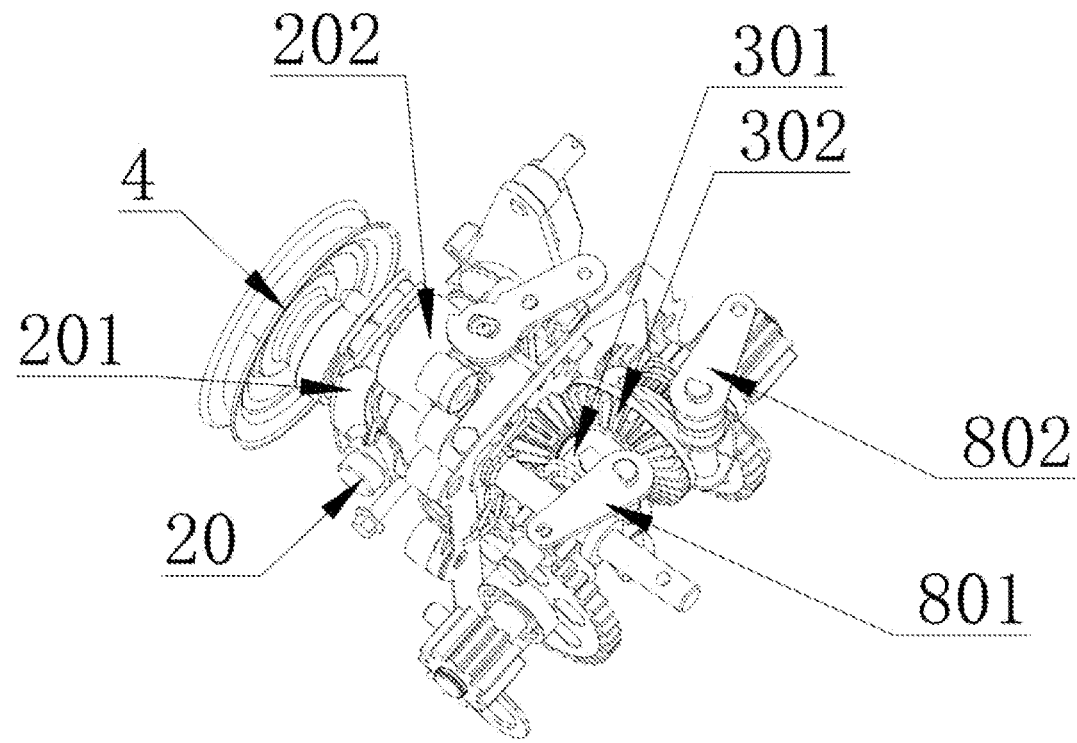
FIG. 4 is a three-dimensional view of a hydraulic drive axle with two-way clutch control of the present invention in which a housing is removed.
Figure 6:
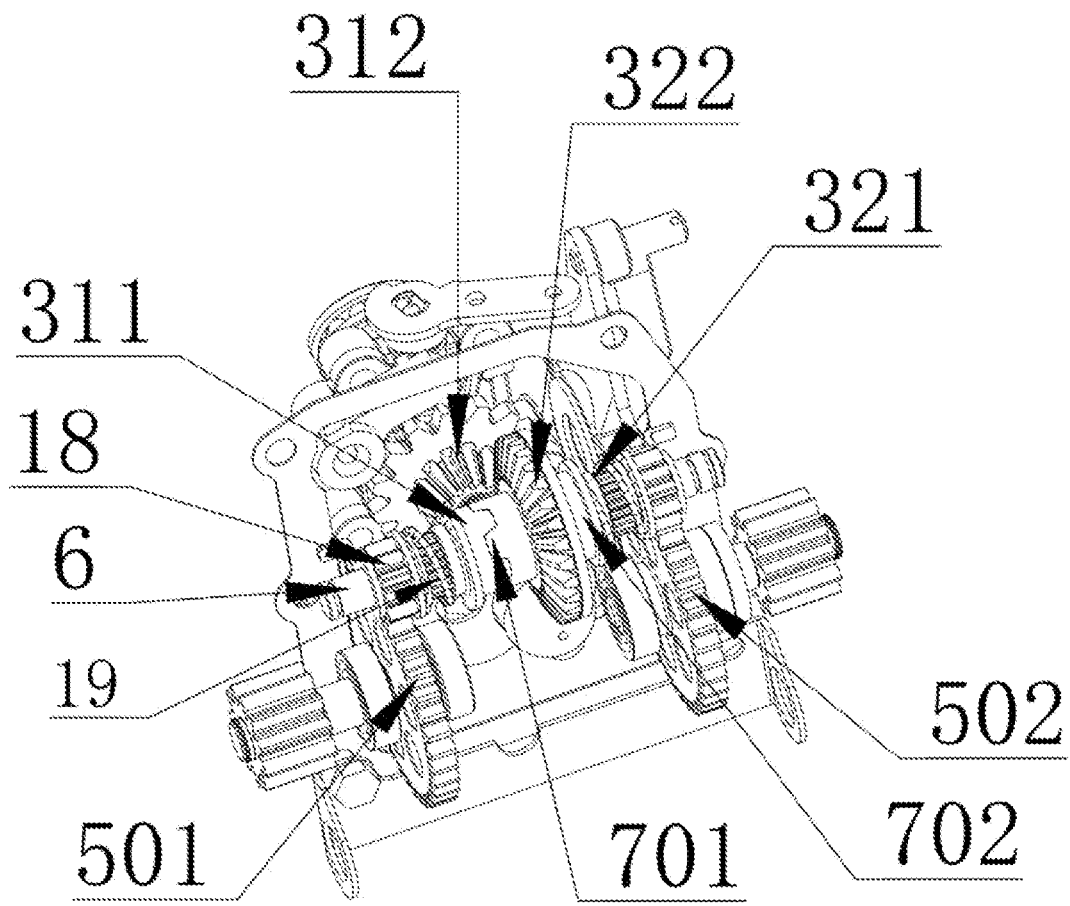
FIG. 6 is a schematic structural view of a driving assembly of a hydraulic drive axle with two-way clutch control of the present invention.

Referring to FIGS. 2, 4 and 6, the clutch 301 comprises a first clutch 311 and a second clutch 321. The first clutch 311 and the second clutch 321 are arranged on both sides of the driving wheel set 302, respectively. The first clutch 311 is meshed with a first runner 501 on one side for transmission, and the second clutch 321 is meshed with a second runner 502 on the other side for transmission. The first clutch 311 is meshed with the first runner 501 for transmission, and the second clutch 321 is meshed with the second runner 502 for transmission, which can realize independent clutch control of the runner 5 on both sides. Therefore, the operating requirements of the hydraulic axle in different situations are realized, and in-situ steering and other operations can be realized. The internal structure is simple, and it is easy for users to operate and use.

Referring to FIGS. 2, 4 and 6, the driving wheel set 302 comprises a driving gear 312 and a bevel gear 322, the driving gear 312 is connected to and matched with the plunger motor 202, and the bevel gear 322 is meshed with the driving gear 312 and matched with the clutch 301. A rotary rod 6 is rotatably arranged in housing 1, and the bevel gear 322, the first clutch 311 and the second clutch 321 are all coaxially rotatably arranged on the rotary rod 6. By means of the arrangement of the driving gear 312 and the bevel gear 322, the power of the plunger motor 202 can be transmitted to the clutch 301 and the runner 5, and the arrangement of the rotary rod 6 can ensure that the internal structural arrangement is more reasonable.

Referring to FIGS. 2, 4 and 6, a first gear tooth 701 and a second gear tooth 702 are formed on both sides of the driving gear 312, respectively, a first controller 801 and a second controller 802 are provided on the first clutch 311 and the second clutch 321, respectively, the first controller 801 is used to control disengagement and engagement between the first clutch 311 and the first gear tooth 701, and the second controller 802 is used to control disengagement and engagement between the second clutch 321 and the second gear tooth 702. The first controller 801 and the second controller 802 independently control the first clutch 311 and the second clutch 321, respectively, which is convenient for user operation and use. The arrangement of the first gear tooth 701 and the second gear tooth 702 ensures the meshing between the driving gear 312 and the clutch 301, and the overall structural arrangement is more reasonable.

Figure 3:
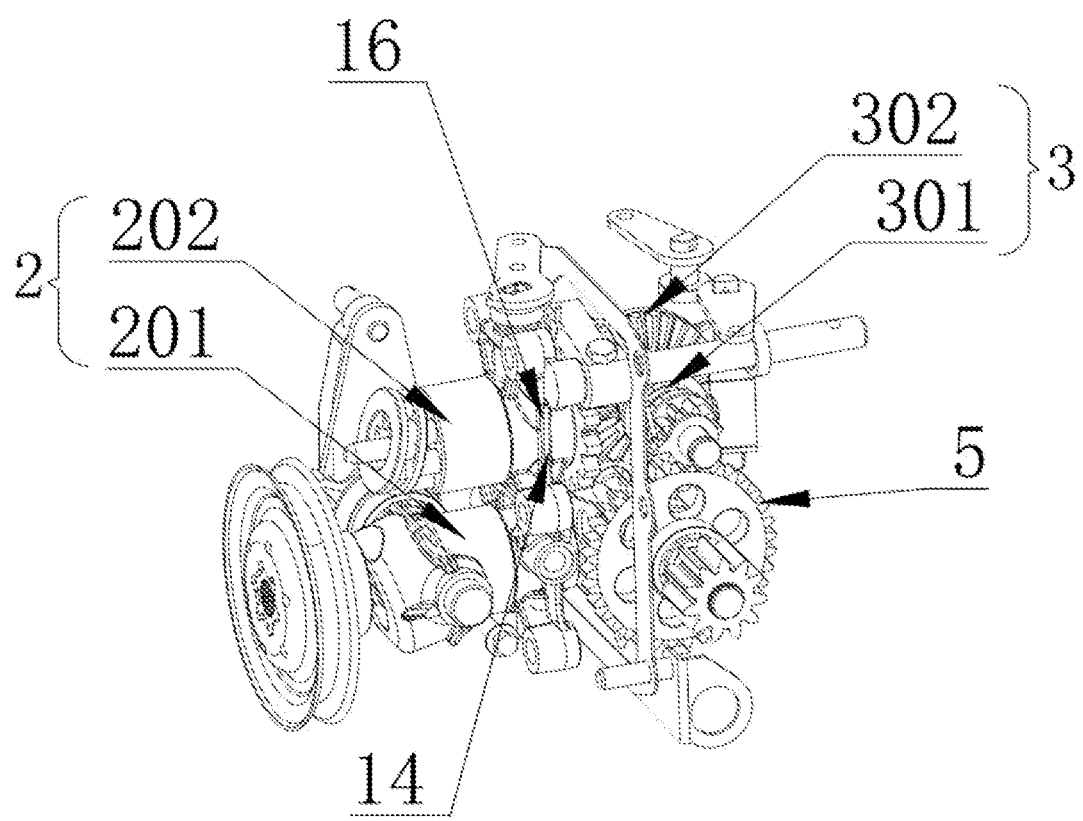
FIG. 3 is a schematic structural view of a hydraulic drive axle with two-way clutch control of the present invention in which a housing is removed.
Figure 5:
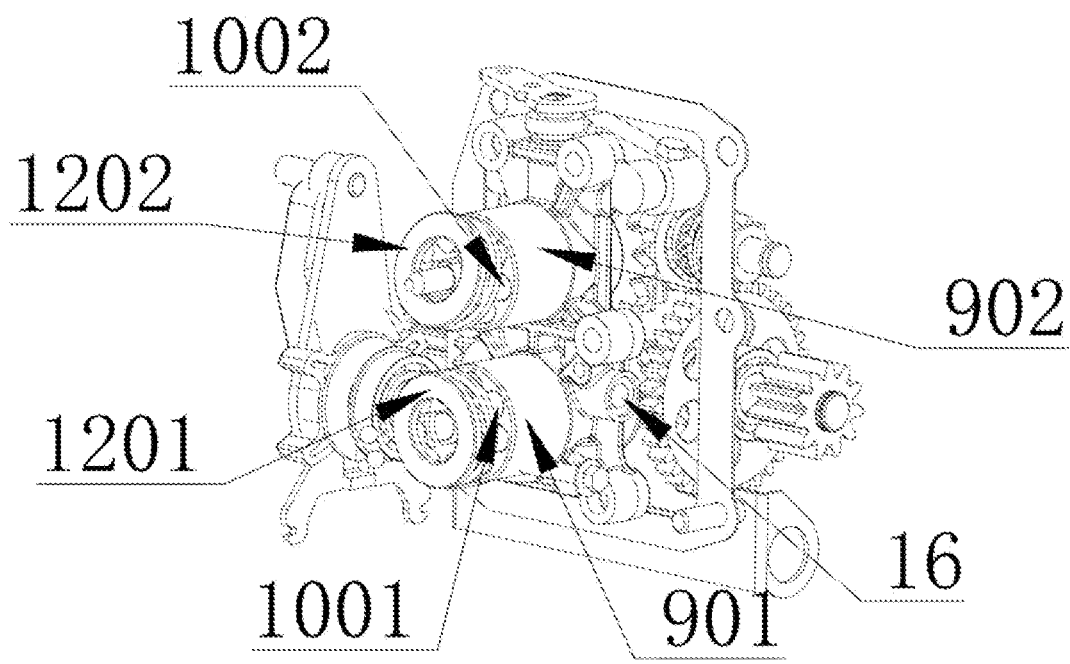
FIG. 5 is a schematic structural view of a power assembly of a hydraulic drive axle with two-way clutch control of the present invention.

Referring to FIGS. 1, 3 and 5, one side of the plunger pump 201 is provided with a swash plate 14, the plunger pump 201 comprises a first cylinder 901 and a first plunger 1001, the first cylinder 901 is rotatably arranged in the swash plate 14, the first plunger 1001 is synchronously rotatably connected to an input shaft 11 of the external driving device 4, and the first plunger 1001 is annularly arranged in the first cylinder 901 and arranged in the same direction as the input shaft 11. A first thrust bearing 1201 is provided between the plunger pump 201 and the swash plate 14, one end of first plunger 1001 is arranged in first cylinder 901, and the other end of the first plunger 1001 is matched with the first thrust bearing 1201. The first cylinder 901 can rotate synchronously with the input shaft 11, and it is combined with the first thrust bearing 1201 to make the first plunger 1001 reciprocate in the first cylinder 901, realizing the control of oil pressure to ensure that the plunger motor 202 can be driven to operate. When the swash plate 14 is adjusted, the inclination angle of the first thrust bearing 1201 can be changed so as to realize different internal oil pressure control.

Referring to FIGS. 1, 3 and 5, the plunger motor 202 comprises a second cylinder 902 and a second plunger 1002, the second cylinder 902 is synchronously rotatably connected to an output shaft of the driving wheel set 302, and the second plunger 1002 is annularly arranged in first cylinder 902 and arranged coaxially with the output shaft. An oblique stop groove is provided on the housing 1, a second thrust bearing 1202 is provided between the second cylinder 902 and the oblique stop groove, one end of the second plunger 1002 is matched with the second thrust bearing 1202, and elastic bodies are provided between the first cylinder 901 and the first plunger 1001, and between the second cylinder 902 and the second plunger 1002. The oblique stop groove is arranged obliquely on the housing 1 at a certain angle, and the oil pressure of the plunger pump 201 can drive the second plunger 902 to be matched with second thrust bearing 1202 and reciprocate in the second cylinder 1002, so as to drive the second cylinder 1002 to rotate. Therefore, the power output is realized, the overall structure is simple, the power output is stable, and the stepless speed change can be realized.

Referring to FIGS. 1, 3 and 5, the plunger pump 201 and the plunger motor 202 are sealed with an oil separator 16 at one side, and the outer side of the end of the oil separator 16 close to the plunger pump 201 is provided with an oil inlet passage 15, and both ends of the oil inlet passage 15 are provided with one-way control valves 20 for controlling the flow of external oil into the plunger pump 201. Therefore, the one-way circulation inside the plunger pump 201 can be achieved, which can achieve a certain effect of replenishing oil, and the internal structural arrangement is more reasonable.

Referring to FIGS. 2, 4 and 6, one end of the rotary rod 6 and the first clutch 311 are meshed and provided with a linkage gear 18, and an elastic member 19 for resetting the first clutch 311 is arranged between the first clutch 311 and the linkage gear 18. Therefore, the meshing engagement between the clutch 301 and the bevel gear 322 can be ensured, and the internal structural arrangement is more reasonable.

By means of the provided plunger pump and plunger motor, the hydraulic drive axle with two-way clutch control in this embodiment can ensure a more stable power output, and can realize the independent control of the runner on both sides. The oil pressure is used to drive the transmission, which abandons the traditional gear meshing transmission, and can realize stepless speed change. Moreover, by means of the engagement of the clutch and the driving wheel set, the output on both sides is controlled independently, so as to meet the needs of different scenarios such as turning while ensuring that the efficiency of power output is higher, the overall structure is simpler and the service life is longer.

Only preferred implementations of the present invention are presented above. It should be noted that for an ordinary person skilled in the art, several improvements and modifications can be made without departing from the technical principles of the present invention, and these improvements and modifications should also be considered to be within the scope of protection of the present invention.

The invention claimed is:

1. A hydraulic drive axle with two-way clutch control, characterized in that it comprises a housing (1), wherein a power assembly (2) and a driving assembly (3) connected to the power assembly (2) are provided in the housing (1); the power assembly (2) comprises a plunger pump (201) and a plunger motor (202); the driving assembly (3) comprises a driving wheel set (302) arranged on one side of the plunger motor (202) and connected to the plunger motor (202), and a clutch (301) meshed with the driving wheel set (302); one end of the plunger pump (201) is connected to an external driving device (4) for rotation of the plunger pump (201); the plunger motor (202) is arranged above the plunger pump (201), and power transmission is realized between the plunger motor (202) and the plunger pump (201) through oil circuit conduction; the clutch (301) is arranged on both sides of the driving wheel set (302) and connected to a runner (5); power is transmitted to the driving wheel set (302) through the plunger pump (201) and the plunger motor (202); the clutch (301) on both sides is separately meshed with the driving wheel set (302) to realize independent control of the runner (5) on both sides; and the plunger pump (201) and the plunger motor (202) are sealed with an oil separator (16) at one side, and the outer side of the end of the oil separator (16) close to the plunger pump (201) is provided with an oil inlet passage (15), and both ends of the oil inlet passage (15) are provided with one-way control valves (20) for controlling the flow of external oil into the plunger pump (201).

2. The hydraulic drive axle with two-way clutch control as claimed in claim 1, characterized in that the clutch (301) comprises a first clutch (311) and a second clutch (321), the first clutch (311) and the second clutch (321) are arranged on both sides of the driving wheel set (302), respectively, and the first clutch (311) is meshed with a first runner (501) on one side for transmission, and the second clutch (321) is meshed with a second runner (502) on the other side for transmission.

3. The hydraulic drive axle with two-way clutch control as claimed in claim 2, characterized in that the driving wheel set (302) comprises a driving gear (312) and a bevel gear (322), the driving gear (312) is connected to and matched with the plunger motor (202), the bevel gear (322) is meshed with the driving gear (312) and matched with the clutch (301), a rotary rod (6) is rotatably arranged in the housing (1), and the bevel gear (322), the first clutch (311) and the second clutch (321) are all coaxially rotatably arranged on the rotary rod (6).

4. The hydraulic drive axle with two-way clutch control as claimed in claim 3, characterized in that a first gear tooth (701) and a second gear tooth (702) are formed on both sides of the driving gear (312), respectively, a first controller (801) and a second controller (802) are provided on the first clutch (311) and the second clutch (321), respectively, the first controller (801) is used to control disengagement and engagement between the first clutch (311) and the first gear tooth (701), and the second controller (802) is used to control disengagement and engagement between the second clutch (321) and the second gear tooth (702).

5. The hydraulic drive axle with two-way clutch control as claimed in claim 3, characterized in that one end of the rotary rod (6) and the first clutch (311) are meshed and provided with a linkage gear (18), and an elastic member (19) for resetting the first clutch (311) is arranged between the first clutch (311) and the linkage gear (18).

6. The hydraulic drive axle with two-way clutch control as claimed in claim 1, characterized in that one side of the plunger pump (201) is provided with a swash plate (14), the plunger pump (201) comprises a first cylinder (901) and a first plunger (1001), the first cylinder (901) is rotatably arranged in the swash plate (14), the first plunger (1001) is synchronously rotatably connected to an input shaft (11) of the external driving device (4), and the first plunger (1001) is annularly arranged in the first cylinder (901) and arranged in the same direction as the input shaft (11).

7. The hydraulic drive axle with two-way clutch control as claimed in claim 6, characterized in that a first thrust bearing (1201) is provided between the plunger pump (201) and the swash plate (14), one end of the first plunger (1001) is arranged in the first cylinder (901), and the other end of the first plunger (1001) is matched with the first thrust bearing (1201).

8. The hydraulic drive axle with two-way clutch control as claimed in claim 6, characterized in that the plunger motor (202) comprises a second cylinder (902) and a second plunger (1002), the second cylinder (902) is synchronously rotatably connected to an output shaft of the driving wheel set (302), and the second plunger (1002) is annularly arranged in the first second cylinder (902) and arranged coaxially with the output shaft.

* * * * *